United States Patent
Liesenfelder et al.

(10) Patent No.: US 6,465,570 B1
(45) Date of Patent: Oct. 15, 2002

(54) PROCESS FOR THE PRODUCTION OF ELASTOMER-MODIFIED THERMOPLASTICS

(75) Inventors: Ulrich Liesenfelder, Bergisch Gladbach; Hans-Jürgen Thiem, Dormagen; Martin Ullrich, Leverkusen, all of (DE)

(73) Assignee: Bayer Aktiengesellschaft (DE)

( * ) Notice: Subject to any disclaimer, the term of this patent is extended or adjusted under 35 U.S.C. 154(b) by 0 days.

(21) Appl. No.: 09/614,918

(22) Filed: Jul. 12, 2000

Related U.S. Application Data

(62) Division of application No. 09/044,410, filed on Mar. 19, 1998.

(30) Foreign Application Priority Data

Mar. 27, 1997 (DE) .......................................... 197 13 039

(51) Int. Cl.$^7$ ................................................ C08G 63/48
(52) U.S. Cl. ............................ 525/53; 525/54; 525/70; 525/71
(58) Field of Search ............................. 525/53, 54, 70, 525/71

(56) References Cited

U.S. PATENT DOCUMENTS

| 3,796,677 | A | | 3/1974 | Laber et al. |
| 4,694,042 | A | | 7/1987 | McKee et al. |
| 4,666,973 | A | | 9/1987 | McKee et al. |
| 6,153,692 | A | * | 11/2000 | Liesenfelder et al. ......... 525/53 |

FOREIGN PATENT DOCUMENTS

| EP | 0 125 483 | 11/1984 |
| EP | 0 153 587 | 9/1985 |
| EP | 0 534 235 | 3/1993 |

* cited by examiner

*Primary Examiner*—Edward J. Cain
(74) *Attorney, Agent, or Firm*—Connolly Bove Lodge & Hutz LLP

(57) ABSTRACT

The present invention relates to a continuous process for the production of impact resistance-modified thermoplastics. An elastomer, in particular a particulate graft polymer with a water moisture content of 1 to 50%, preferably 10 to 40%, is incorporated into a thermoplastics melt in a large volume kneader reactor. The mixing ratio of elastomer to thermoplastics melt is 4:1 to 1:4. The energy required to melt the elastomer and to evaporate the adhering water is added by heating the walls of the apparatus and via the kneading action of the installed rotating parts.

3 Claims, No Drawings

PROCESS FOR THE PRODUCTION OF ELASTOMER-MODIFIED THERMOPLASTICS

CROSS-REFERENCE TO RELATED APPLICATION

The present application is a division of application Ser. No. 09/044,410, filed Mar. 19, 1998.

The present invention relates to a continuous process for the production of elastomer-modified thermoplastics. An elastomer, in particular, an optionally particulate graft polymer with a water moisture content of 1 to 50%, preferably 10 to 40%, is incorporated in a large volume kneader reactor into a thermoplastics melt. The mixing ratio of elastomer to thermoplastics melt is in particular 4:1 to 1:4. The energy required to melt the elastomer and to evaporate the adhering water is added by heating the apparatus walls and through the kneading action of the installed rotating parts.

Elastomer-modified thermoplastic polymers, for example rubber-filled plastics, are normally produced starting from rubber by emulsion graft polymerisation onto a rubber base. The thermoplastic matrix can be economically produced in a bulk or solution process. In emulsion polymerisation a graft polymer for example is produced having a high rubber content (typically 50 wt. %), which after being worked up is compounded with a matrix polymer. The working up of the graft latex takes place via the following processing steps: precipitation, washing, mechanical and thermal drying.

The thermal drying of a graft latex in the solid phase requires of course a very high energy input, and on account of the danger of a dust explosion associated with the drying this procedure is carried out under inert conditions in driers. An object of the invention is accordingly to reduce considerably the energy expenditure compared to the aforementioned processes.

In addition to the commonly employed combination of powder drying followed by compounding with the thermoplastic material, processes for the impact resistance modification of thermoplastics have already been described in the prior art, which are based on incorporating rubber lattices that have been mechanically only partially dewatered, directly into thermoplastic polymers in a screw extruder (see for example D20 37 784). Modified extruder processes are described in the European laid-open specifications EP 0 534 235 A1, EP 0 665 095 A1, EP 0 735 077 A1, EP 0 735 078 A1, EP 0 734 825 A1 and EP 0734 826 A1.

A particular disadvantage of these processes is the high degree of stress to which the rubber/thermoplastics mixture is subjected on account of the high shear rate of up to 1000 $s^{-1}$ in screw extruders.

A further disadvantage is the multistage procedure involved in the last-mentioned process, since first of all water and then the melt mixture is removed, and in a further step the residual degassing of the polymer is carried out.

Since the energy in the extruder is mainly introduced as mechanical energy via the screw shafts, it is possible only to a limited extent to control the energy input via the added heat and avoid thermally stressing the polymers.

The object of the invention is to provide a direct processing method that avoids the danger of dust explosion inherent in processes involving powder drying and that overcomes the various disadvantages of processing in screw extruders.

The invention provides, by means of which the aforementioned objective is achieved, a process for producing elastomer-modified thermoplastics by mixing elastomer, especially rubber, that is surrounded by graft polymerisation with a sheath of a thermoplastics material A, with a thermoplastics material B, the moist elastomer, especially a graft polymer that has been precipitated from a latex, being dewatered to 1 to 50 wt. %, especially 5 to 50 wt. %, and particularly preferably 10 to 40 wt. % residual moisture, and into which is mixed the thermoplastics material B present as melt, which process is characterised in that the evaporation of the process water adhering to the elastomer, especially to the graft polymer, the melting of the elastomer, the compounding of the elastomer with the melt of the thermoplastics material B, as well as the removal of further organic volatile constituents C, are carried out simultaneously in one process chamber.

The dewatering in the first stage is preferably carried out mechanically, for example by squeezing out the water or by centrifugation.

In particular, the energy necessary for the melting, heating and evaporation of the polymer mixture is introduced mechanically via the kneading action of the rotors, and thermally via the surface of the housing of the kneader reactor, the ratio of the mechanical energy and thermal energy to be added to the mixture preferably being 4:1 to 1:6, particularly preferably 2.5:1 to 1:4.

The process is preferably carried out in a large volume, partially filled kneader reactor with installed rotating parts, in which the throughput per liter of process space is not more than 5 kg/hr of polymer. The residence time of the miter in the process space is preferably 2 to 20 minutes.

The kneading action of the rotors is influenced in particular independently of their rotational speed, by controlling the degree of filling of the machine.

In a further preferred variant of the process the water adhering to the elastomer and further volatile constituents C are removed in only one pressure stage, in particular at a pressure of 10 to 2000 hPa.

The dewatering of the polymers is carried out in particular in a kneader reactor in which the mixing and kneading actions of the installed kneader reactor parts are largely decoupled from the transporting movement of the material being mixed.

The mixing ratio of thermoplastics material B and elastomer can in a preferred process be varied in the range from 1:4 to 4:1 without altering the process parameters or the equipment configuration used in the process.

In the mixing of elastomer and thermoplastics material B, in particular additional pigments and/or additives are prepared and processed so that they can be added to the mixture before the latter is dewatered.

In a process variant pigments and/or additives are preferably added to the polymer mixture in a mixer, in particular a static mixer, connected downstream of the process chamber.

Suitable kneader reactors for carrying out the process according to the invention are those which can successfully mix tough plastic phases, for example those disclosed in the publications EP 0 517 068 A1, EP 460 466 B1, EP 0 528 210 A1 or JP-A-63232828. Twin-shaft reactors corresponding to specification EP 0 517 068 A1 are preferably used. Since the mechanical stress to which the rotors are subjected and the required power are in some cases considerably higher than in conventional applications of this type of equipment, it may be necessary with commercially available equipment to reinforce the rotors and choose a considerably more powerful drive unit compared to the conventional specification.

The moist elastomer, especially graft polymer, is in a preferred embodiment added by means of a stuffing screw or a piston lock. Alternatively the elastomer may be added via a strainer-type or squeezer-type screw with partial mechanical removal of the moisture. Furthermore, in the preferred embodiment the thermoplastics melt is added via the inlet-side front plate of the kneader reactor, which prevents the generally temperature-sensitive elastomer coming into contact with the hot surfaces of the housing. Instead, as soon as the elastomer enters the large volume kneader reactor it is embedded in the thermoplastics melt B. Also the harmful influence of any possible by-products on the resultant mire due to the relatively long educt residence time in the initial section of the kneader reactor is avoided. The dewatered, degassed and compounded, elastomer-modified thermoplastic material is discharged from the kneader reactor preferably via a discharge screw or gear pump at or in the vicinity of the front plate opposite the inlet. The reactor volume is optimally utilised by means of this arrangement. A melt screening and granulation stage according to the prior art may be coupled to the discharge unit. The vapours are removed through a degassing vent which is preferably arranged in the vicinity of the product discharge outlet, and can then be condensed in a manner known per se. If the degassing vent is arranged closer to the feed point there is an increased danger that the yield will be reduced due to escape of powder. Furthermore, in the preferred embodiment the degassing vent is cleaned by a screw, which prevents melt passing into the vapour channel and forming blockages. In the preferred embodiment all surfaces of the kneader reactor that come into contact with the product are also heated. In this way the energy input into the process chamber is maximised, which means that the processes can be operated in an economically optimum manner. The process is preferably carried out at an internal pressure of 1 hPa to 5000 hPa, especially 10 to 2000 hPa, but most preferably at normal pressure, optionally also under the addition of inert gases. The temperature of the heated apparatus walls is in particular 150 to 350° C. preferably 180 to 300° C., and particularly preferably 200 to 270° C. The specific power for a reactor with installed rotating parts is in particular 0.01 to 1 kWh per kg of dry polymer melt, preferably 0.05 to 0.5 kWh/kg, and particularly preferably 0.05 to 0.25 kWh/kg.

Suitable graft polymers for carrying out the process according to the invention are graft-polymerised vinyl compounds, for example styrene, alpha-methylstyrene, acrylonitrile, methyl methacrylate and alkyl acrylate or mixtures thereof, particularly preferred are methyl methacrylate as well as mixtures of styrene and acrylonitrile, alpha-methylstyrene and acrylonitrile, methyl methacrylate and styrene, methyl methacrylate and alkyl acrylate, and alpha-methylstyrene, methyl methacrylate and acrylonitrile. Suitable rubbers (graft bases) are diene homopolymers and copolymers, for example of butadiene, isoprene, chloroprene, optionally with up to 35 wt. % of comonomers such as styrene, acrylonitrile, methyl methacrylate, alkyl acrylate, vinyl methyl ether, or alkyl acrylate polymers (in particular of $C_1$–$C_{10}$ alkyl acrylates), which optionally contain up to 20 wt. % of vinyl monomers incorporated by polymerisation, such as styrene, acrylonitrile, vinyl acetate, or $C_1$–$C_{10}$-alkyl methacrylate; the acrylate rubbers are optionally partially crosslinked by incorporating by polymerisation polyfunctional vinyl or allyl monomers; crosslinking monomers are for example bis-acrylates, bis-acrylamides, butadiene, vinyl acrylate, triallyl cyanurate, trialkyl isocyanurate, trisallyl citrate, or bis-carboxylic acid vinyl ester.

As elastomer there may be used in the process according to the invention any polymer that has elastomeric properties and that can be added to an extruder. Suitable rubbers are for example nitrile rubbers and partially saponified nitrile rubbers. Particulate rubbers in particular are used. Especially preferred are those rubbers that have a grafted-on sheath of another substance, generally not the elastomeric thermoplastic material A.

Acrylate rubbers contain the crosslinking monomers in amounts of up to a maximum of 5 wt. %. The rubbers may also have a core/jacket structure, i.e. the acrylate rubber particles contain a rubber core that is structurally different from the surrounding acrylate rubber, or a hard thermoplastic resin core. In particular stages may be polymerized from one or more of the monomers styrene, alkyl styrene, acrylonitrile or methyl methacrylate. Preferred are graft polymers based on butadiene/styrene/acrylonitrile, n-butyl acrylate/styrene/acrylonitrile, butadiene/n-butyl acrylate/styrene/acrylonitrile, n-butyl acrylate/styrene/methyl methacrylate, butadiene/styrene/acrylonitrile/methyl methacrylate, and butadiene/n-butyl acrylate/methyl methacrylate/styrene/acrylonitrile.

Together with these preferred graft polymers, styrene/acrylonitrile (SAN) copolymers, polystyrene, polymethyl methacrylate, polyvinyl chloride or mixtures of these polymers are used as thermoplastic materials B.

In this connection SAN polymers, polymethyl methacrylate (PMMA) or mixtures of these polymers are particularly preferred as thermoplastics material B. Copolymers that are particularly preferably used are obtained from 20 to 40 wt. % of acrylonitrile and 80 to 60 wt. % of styrene or alpha-methyl styrene. These copolymers are known and can be prepared by free-radical polymerisation, for example in emulsion, suspension, solution or bulk The copolymers preferably have a molecular weight $M_w$ of 15 000 to 200 000.

Furthermore polycarbonate, poly(butylene terephthalate), poly(oxymethylene), poly(methyl methacrylate), poly(phenylene sulphide), polysulphones, poly(ether sulphone)s and polyamides and mixtures of these thermoplastics may also be used as thermoplastic material B.

The graft polymer lattices generally contain 30 to 90 wt. % of rubber, and preferably 50 to 85 wt. %.

The vinyl polymer lattices may be prepared in a known manner by emulsion polymerisation in aqueous media or emulsion graft polymerisation in the presence of rubber lattices. In the case of rubber-free polymers the monomers are polymerised in aqueous media by a free-radical reaction in the presence of soaps (emulsifiers) at pH values of ca. 12 to 2, in particular 10 to 3. As initiators there may be used in particular water-soluble radical-formers such as peroxo disulphates, peroxo diphosphates, water-soluble hyperoxides and peroxo acids, as well as redox initiator systems. The polymerisation, which is normally carried at 40 to 90° C., requires the presence of an ionic emulsifier, especially an anionic emulsifier, in amounts of up to 4 wt. %, preferably up to 2.5 wt. %, with respect to the monomers. Suitable emulsifiers are for example fatty acid salts, alkylsulphonic acid salts with long-chain alkyl radicals and sulphuric acid alkyl semiesters with long-chain alkyl radicals as well as, preferably, alkali salts of disproportionated abietic acid.

The vinyl polymer lattices prepared in this way generally have a polymer solids content of 10 to 70 wt. %, preferably 25 to 50 wt. %. The proportion of non-polymerised monomers in the latex is generally 0 to 15 wt. %, preferably 0 to 5 wt. %, with respect to the polymer solids content of the latex. The size of the vinyl polymer latex particles is 50 to 1000 nm, preferably 80 to 650 nm.

The lattices are coagulated by processes well-known per se (see for example EP 459 161 A2).

As coagulating agent there are preferably used aqueous solutions of water-soluble inorganic or organic acids and/or their salts, such as hydrochloric acid, sulphuric acid, phosphoric acid, boric acid, formic acid, acetic acid, propionic acid, citric acid, alkali metal and alkaline earth metal chlorides, sulphates, formates, acetates, phosphates, carbonates, aluminates, partially saponified polyvinyl acetates, optionally in combination with inorganic or organic acids. 0.2 to 25 wt. % of aqueous solutions are used depending on the vinyl polymer latex mixture to be coagulated.

The expression organic volatile constituents C denotes monomers and low molecular weight oligomers of the employed thermoplastic polymers and/or elastomers or graft polymers (for example styrene, acrylonitrile), emulsifier constituents (for example dihydroabietic acid) or solvents that are used in the preparation of the graft polymers and/or thermoplastics (for example ethylbenzene, methyl ethyl ketone).

In contrast with the known extrusion processes, the process according to the invention is characterized by a gentle and optionally continuous processing of the starting components. In extruders, i.e. in the described known processes with twin-shaft screws rotating in the same direction, the highest shear rates occur between the screw shafts and between the screw shaft and the housing wall. Under conventional known processing conditions this shear rate is of the order of magnitude of $1000 \text{ s}^{-1}$, and is thus considerably higher than the mean shear rate quoted in EP 0 734 825 A1, which is governed by the less strongly sheared flow in the screw channel. However, it is the maximum stress that is relevant in evaluating the damage to the product. During the processing in the kneader reactor this maximum stress is of an order of magnitude of $100 \text{ s}^{-1}$, and is thus considerably lower. A particular feature of the process according to the invention is that for example the shear-sensitive graft polymer is mixed with thermoplastics melt immediately after entry into the reactor. In the extrusion process according to EP 0 735 077 A1, EP 0 735 078 A1, EP 0 734 825 A1, and EP 0 734 826 A1 however, the graft polymer is already subjected to a high shear rate before a lubricating action takes place as a result of the addition of thermoplastics melt. Moreover, the thermal stress to which the polymer is subjected is also less since the addition of energy, which occurs in a dissipative manner via the kneading action of the rotors and thermally via the heating of the walls, can be matched by a free choice of the rotor speed and the heating temperature to the energy required to evaporate the water. When processing in extruders the possibility of influencing the processing by controlling the temperature of the housing is slight since by far the greatest proportion of the energy is added via the dissipative action of the screw shafts. The process steps of water evaporation and residual degassing of the polymer take place is succession in the extruder, whereas they occur simultaneously for example in the kneader reactor. Inevitably further mechanical energy is thereby added to the extruder after completion of the water evaporation step, which results in a further thermal stress on the polymer. In the process according to the invention the evaporation of water and other volatile constituents occurs at the same time. The process can thus be controlled so that the elastomer-modified thermoplastic material is discharged from the reactor after completion of the water evaporation step without subjecting the melt to any further thermal stress.

In contrast to the known processes, the process according to the invention is characterised by a high yield. Whereas in the known extrusion processes up to 10% of polymer is discharged together with the expressed water in the squeezing zones and the evaporation rates in the evaporation zones are high on account of the small cross-sections of the screw channel with the resultant danger that polymer will be entrained with the vapours, in the process according to the invention there is practically no loss of product. On account of the large free cross-section of for example a kneader reactor, the evaporation rate is always so low that no polymer is entrained.

The aforementioned advantages result in a high degree of flexibility, which is yet a further advantage of the process according to the invention. On account of the gentle processing conditions mixtures containing a very high proportion of elastomer can be processed without damaging the product. Also, mixtures with a comparatively high water content can be processed without adversely affecting the yield.

Several process steps take place in succession in the extruder, more precisely the steps described in detail in the printed specifications EP 0 735 077 A1, EP 0 735 078 A1, EP 0 734 825 A1 and EP 0 734 826 A1, in each case the screw geometry being adapted to the process step and the product to be processed. In the kneader reactor the melting of the elastomer, for example the graft polymer, the compounding of the two melts, and the evaporation and degassing of water as well as optionally of monomers and other organic volatile constituents are carried out simultaneously in one process chamber. It is therefore in particular not necessary to adapt the reactor to particular product properties. Mixtures of elastomer and thermoplastic matrix in a mixing ratio of 1:4 to 4:1 are of particular practical interest. The whole spectrum of these polymer blends can be produced in one and the same machine without any special adaptation. In particular, pigments and/or additives can also be added already during the preparation of the polymer mixture, with the result that a further compounding can be omitted. The process is accordingly characterised by a high degree of simplicity. The process is a one-stage process, whereas the known extrusion processes are necessarily multistage processes. If the process is preferably carried out under normal pressure, no special vacuum technology is required. Despite this, a low residual content of volatile constituents is achieved. All commercially available processes that use extruders to achieve the desired objective operate with additional vacuum technology.

The mean residence time of the product when carrying out the process in the process chamber, in particular in a kneader reactor, is typically 2 to 20 minutes, preferably 3 to 10 minutes. The residence time is thus considerably longer than in a conventional extrusion process, where the typical residence time is less than 1 minute. It has surprisingly been found however that better colour values of the final polymer mixture can be achieved with the process according to the invention than with an extrusion process.

EXAMPLES

In the following examples the following polymers are used:

Composition A)

A partially crosslinked polybutadiene latex grafted with styrene and acrylonitrile in a weight ratio of 72:28 (mean diameter of the latex particles $d_{50}$=400 nm) with a polymer content of 36.5 wt. % and a residual monomer content of 0.75 wt. %, with respect to the polymer. The graft polymer contains 55 wt. % of rubber.

Composition B)

A partially crosslinked polybutadiene latex grafted with styrene and acrylonitrile in a weight ratio of 72:28 (mean diameter of the latex particles $d_{50}=120$ nm) with a polymer content of 36.5 wt. % and a residual monomer content of 0.5 wt. %, with respect to the polymer. The graft polymer contains 50 wt. % of rubber.

The lattices are prepared according to known methods (cf. U.S. Pat. No. 4,399,273). The mean particle diameter ($d_{50}$ value) is determined by ultracentrifuge measurement (W. Scholtan, H. Lange; Kolloidz. und Z. Polymere 250 (1972) 782–796).

Graft polymer BMG:

A mixture of 50 wt. % of each of the vinyl polymer lattices A and B is coagulated in a falling cascade at above 92° C. by adding $MgSO_4$ and acetic acid, and is then neutralised, filtered, washed free of electrolyte, and after washing is dewatered in a centrifuge or through a band press to 28 to 35 wt. % water content. This product is used for the further examples.

Graft polymer P50:

Graft polymer latex A is treated like graft polymer B, coagulated, and after washing is dewatered in a centrifuge or through a band press to 28 to 35 wt. % water content. This product is used for the further examples.

Thermoplastic SAN M60 (L-value 60):

Styrene/acrylonitrile copolymer comprising 72 wt. % of styrene and 28 wt. % of acrylonitrile, with a molecular weight (weight modulus) $M_w$ of ca. 80 000 and a non-uniformity $U=M_w/M_N-1=2$.

Example 1

10.625 kg per hour of a styrene/acrylonitrile copolymer (SAN) with an L-value of 60 are added at a melt temperature of 230° C. to a modified ORP12 reactor manufactured by List AG, Arisdorf (Switzerland), with rotors reinforced as regards torsional resistance. The reactor has a usable volume of 30.6 l. 49 kg per hour of a graft polymer BMG containing 34.6% of water are also added in powder form by means of a stuffing screw to the reactor. The rotational speed of the two rotors of the reactor is 100 and 25 revolutions per minute. The molten, compounded product free of volatile constituents is extruded at a temperature of 237° C. by means of a twin-shaft extrusion screw. The reactor walls and the rotors are heated with thermal oil at a temperature of 275° C. A mechanical output of 3 kW is taken off at the rotor shafts. A heating capacity of about 12 kW is added via the apparatus walls. Overall, a specific capacity of 0.47 kWh/kg is added with respect to the graft polymer. The mean residence time of the product in the apparatus is ca. 11 minutes, i.e. the apparatus is on average filled to about 27% with polymer mixture.

GC-analysis shows a residual content of volatile constituents of 320 ppm in the product. The educts contained around 2000 ppm (from the graft polymer) and 1000 ppm (from SAN) of volatile components. The resultant product is kneaded in a ratio of 40:60 with styrene/acrylonitrile copolymers (SAN) with an L-value of 60 and extruded in the form of platelets for colour evaluation.

Comparison Example 1

By way of comparison, a graft polymer that has undergone a thermal drying is kneaded with a styrene/acrylonitrile copolymer (SAN) having an L-value of 60, so as to produce the same rubber content. A comparison of the colour pattern plates from both processes did not reveal any difference in colour.

The energy expenditure just for the thermal drying of the graft polymer in an open flow drier is 0.85 kWh/kg.

Example 2

70 kg per hour of a styrene/acrylonitrile copolymer (SAN) with an L-value of 60 are added at a melt temperature of 230° C. to the ORP 12 reactor manufactured by List AG, Arisdorf (Switzerland). The reactor has a usable volume of 30.6 l. 42.6 kg per hour of a graft polymer P50 containing 29% of water are also added in powder form by means of a stuffing screw to the reactor. The rotational speed of the two rotors of the reactor is 120 and 30 revolutions per minute. The energy added via the rotor shafts is 7.6 kW. 4.8 kW of energy is supplied through the wall of the housing. The degree of filling of the apparatus is 36% (with respect to the polymer mixture) and the mean residence time of the mixture in the apparatus is 6.5 minutes. The molten, compounded product free of volatile constituents is extruded at 240° C. by means of a twin-shaft extrusion screw. The reactor walls and rotors are heated with thermal oil at a temperature of 270° C.

Example 3

67.18 kg per hour of a styrene/acrylonitrile copolymer (SAN) with an L-value of 60 are added at a melt temperature of 230° C. to a CRP 12 reactor with reinforced rotors, manufactured by List AG, Arisdorf (Switzerland). The reactor has a usable volume of 30.6 l. 44 kg per hour of a graft polymer containing 34.5% of water are likewise added in the form of powdered BMG by means of a stuffing screw to the reactor. The rotational speed of the two rotors of the reactor is 100 and 80 revolutions per minute. The energy added via the rotor shafts is 15.2 kW. The degree of filling of the apparatus is 31% and the mean residence time in the apparatus is 6 minutes. The molten, compounded product free of volatile constituents is extruded at 234° C. by means of a twin-shaft extrusion screw. The reactor walls and rotors are heated with thermal oil at a temperature of 250° C.

A GC analysis shows a residual content of volatile constituents of 60 ppm in the product. The educts contained around 2000 ppm (from the graft polymer) and 1000 ppm (from SAN) of volatile constituents.

Comparison Example 2

10.615 kg per hour of a graft polymer containing 14.8% of water are added to a double-thread twin-shaft screw, the screw having a self-cleaning profile and the shafts rotating in the same direction. 3.025 kg per hour of a styrene/acrylonitrile copolymer (SAN) with an L-value of 60 are melted in a side extruder and added at a melt temperature of 230° C. to the main extruder. The twin-shaft screw has a housing diameter of 34 mm and an axial spacing of 28 mm. The free volume of the screw is 1.03 l. The rotational speed of the screw shafts of the main extruder is 150 revolutions per minute. After the product streams have been combined, the resulting product passes through a mixing zone containing kneading elements. The major proportion of the moisture is then evaporated in a degassing zone that is operated at normal pressure. The residual degassing takes place in two further degassing zones that are operated at 500 mbar and 20 mbar absolute pressure. The product is extruded at a temperature of 220° C. The mean residence time of the product in the twin-shaft screw is ca. 100. The resultant product is kneaded in a ratio of 40:60 with styrene/acrylonitrile copolymers (SAN) with an L-value of 60 and is extruded in the form of platelets for the colour evaluation. As a comparison, a graft polymer that has undergone a thermal drying is kneaded with a styrene/acrylonitrile copolymer (SAN) with an L-value of 60, so as to produce the same rubber content. A comparison of the colour of the extrusions shows that the colour has been adversely affected by the compounding of the moist product in the twin-shaft screw.

What is claimed is:

1. An elastomer-modified thermoplastic comprising a mixture of a rubber, surrounded by a sheath of a thermoplastic material A by graft polymerization, and a thermoplastic material B, and wherein the rubber is produced by emulsion polymerization and wherein the elastomer-modified thermoplastic contains no more than 320 ppm of residual volatile components.

2. An elastomer-modified thermoplastic as in claim 1 containing no more than 60 ppm of residual volatile components.

3. An elastomer-modified thermoplastic as in claim 1 in the form of a moulding.

* * * * *